United States Patent
Hara (10) Patent No.: US 9,086,792 B2
(45) Date of Patent: Jul. 21, 2015

(54) DISPLAY CONTROL APPARATUS AND CONTROL METHOD THEREOF

(71) Applicant: CANON KABUSHIKI KAISHA, Tokyo (JP)

(72) Inventor: Kenichiroh Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 13/736,281

(22) Filed: Jan. 8, 2013

(65) Prior Publication Data

US 2013/0176256 A1 Jul. 11, 2013

(30) Foreign Application Priority Data

Jan. 10, 2012 (JP) ................................ 2012-002209

(51) Int. Cl.
*G06F 3/041* (2006.01)
*G06F 3/0485* (2013.01)
*G06F 3/0488* (2013.01)

(52) U.S. Cl.
CPC .......... *G06F 3/0485* (2013.01); *G06F 3/04855* (2013.01); *G06F 3/04883* (2013.01)

(58) Field of Classification Search
CPC .......... G06F 3/04585; G06F 3/0485–3/04855; G06F 3/046
USPC .................. 345/684, 173–178; 715/786–789
See application file for complete search history.

(56) References Cited

U.S. PATENT DOCUMENTS

| | | | |
|---|---|---|---|
| 2003/0025716 A1* | 2/2003 | Colavin | 345/684 |
| 2007/0002027 A1* | 1/2007 | Lii et al. | 345/173 |
| 2009/0160803 A1* | 6/2009 | Hashimoto | 345/173 |
| 2011/0025628 A1* | 2/2011 | Lin et al. | 345/173 |

FOREIGN PATENT DOCUMENTS

| | | |
|---|---|---|
| CN | 101739206 A | 6/2010 |
| JP | 2011-164129 A | 8/2011 |
| TW | 200701048 A | 1/2007 |

\* cited by examiner

*Primary Examiner* — Alexander Eisen
*Assistant Examiner* — Sanjiv D Patel
(74) *Attorney, Agent, or Firm* — Canon USA Inc. IP Division (57) ABSTRACT

A display control apparatus includes a detection unit for detecting a touch operation on a display unit, a storing unit for temporarily storing data of a plurality of images, and a display control unit for performing, in response to the detection unit detecting a touch operation including a movement with a touch kept on the display unit, a scrolling process for scrolling an image displayed on the display unit to display another image temporarily stored in the storing unit, and performing, in response to the detection unit detecting a touch operation including a movement for a predetermined distance or longer with a touch kept on the display unit, an updating process for updating the data of the plurality of images temporarily stored in the storing unit with data of another plurality of images to display the images included in the other plurality of images on the display unit.

18 Claims, 7 Drawing Sheets

DISPLAY CONTROL APPARATUS AND CONTROL METHOD THEREOF

BACKGROUND OF THE INVENTION

1. Field of the Invention

The present invention relates to a display control apparatus for displaying an image on a touch-operable display unit, and a control method thereof.

2. Description of the Related Art

In recent years, a device capable of displaying a plurality of images on a display apparatus that includes a touch panel, and capable of switching the displayed image by performing scrolling according to a touch operation on the touch panel has become widely used.

Japanese Patent Application Laid-Open No. 2011-164129 discusses a technique in which scrolling in an upward direction can be instructed by an upward stroking operation on the touch panel, and scrolling in a downward direction can be instructed by a downward stroking operation on the touch panel, while a plurality of images is being displayed. Further, the images arranged upstream, instead of the images arranged downstream, with respect to a direction in which the images move by scrolling, are displayed first. A large number of images can thus be displayed while scrolling is performed even if the images cannot be displayed sufficiently in time with high-speed scrolling. Furthermore, a greater number of images than the number of images included in a display range are buffered.

If a plurality of displayable images are cached so that scrolling can be performed within the range of the cached images as discussed in Japanese Patent Application Laid-Open No. 2011-164129, scrolling can be performed with high responsiveness. In such a case, if the images that are not cached are to be displayed, the cache is updated according to a cache update instruction, and scrolling can thus be performed within the range of the newly cached images. However, if the operation for instructing scrolling to be performed within the cached images is totally different from the operation for instructing cache updating to be performed for displaying the images that are not cached, operability becomes low. The desired image thus cannot be displayed only by intuitive stroking on the touch panel. On the other hand, if the cache update instruction operation is performed as often as scrolling within the cached images, the cache becomes frequently updated. As a result, the responsiveness with respect to the operation becomes low, and the cache is unnecessarily updated so that processing load is increased.

SUMMARY OF THE INVENTION

An embodiment of the present invention is directed to a display control apparatus capable of realizing an operation for instructing scrolling within cached images with an intuitive operational feeling and capable of realizing an operation for instructing updating of a cache for displaying uncached images with a similar intuitive operational feeling. At the same time, the display control apparatus is capable of suppressing an undesired cache updating process.

According to an aspect of the present invention, a display control apparatus includes a detection unit configured to detect a touch operation on a display unit, a storing unit configured to temporarily store data of a plurality of images, and a display control unit configured to perform, in response to the detection unit detecting a touch operation including a movement with a touch kept on the display unit, a scrolling process for scrolling an image displayed on the display unit to display another image temporarily stored in the storing unit, and to perform, in response to the detection unit detecting a touch operation including a movement for a predetermined distance or longer with a touch kept on the display unit, an updating process for updating the data of the plurality of images temporarily stored in the storing unit with data of another plurality of images to display the images included in the other plurality of images on the display unit. Another embodiment of the present invention is a method for controlling an apparatus. The method includes displaying on the apparatus a first subset of a first plurality of images stored on the apparatus. Detecting a touch operation on the apparatus of a first type or a second type. In response to detecting a touch operation of the first type, displaying on the apparatus a second subset of the first plurality of images stored on the apparatus. In response to detecting a touch operation of the second type, sending a request to an external device for a second plurality of images, and displaying on the apparatus a third subset of the second plurality of images.

According to an exemplary embodiment of the present invention, the operation for instructing scrolling within the cached images and the operation for instructing updating of the cache for displaying the uncached images can be similarly realized with an intuitive operational feeling. At the same time, an undesired cache updating process can be suppressed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

According to the exemplary embodiment of the present invention, an image display system in which a smartphone 100 and a digital camera 200 are communicable with one another will be described below.

Figure 1:
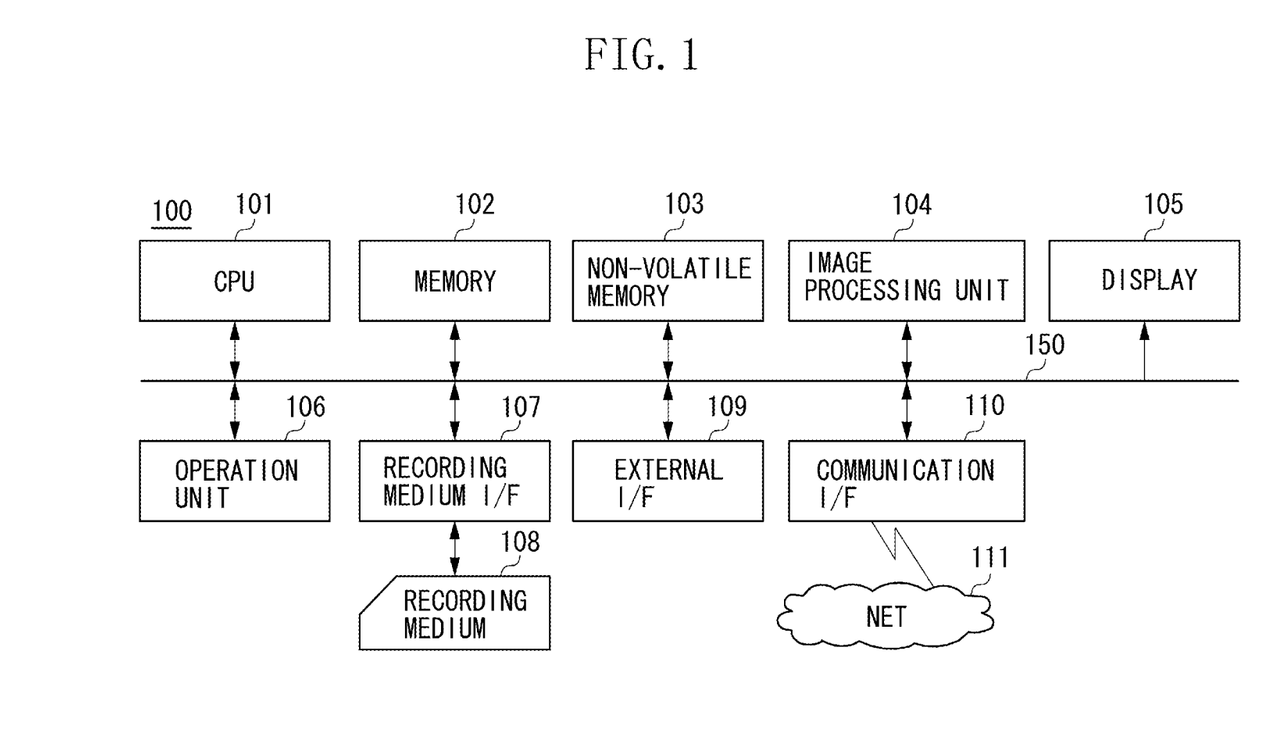
FIG. 1 illustrates a configuration of a smartphone according to an exemplary embodiment of the present invention.

FIG. 1 illustrates a configuration of the smartphone 100 that functions as the display control apparatus according to the present exemplary embodiment. Referring to FIG. 1, a central processing unit (CPU) 101, a memory 102, a non-volatile memory 103, an image processing unit 104, a display 105, an operation unit 106, a recording medium interface (I/F) 107, an external I/F 109, and a communication I/F 110 are connected to an internal bus 150. Each of the units connected to the internal bus 105 is capable of exchanging data between one another via the internal bus 150.

The CPU 101 uses the memory 102 such as a random access memory (RAM, i.e., a volatile memory employing a semiconductor device) as a work memory and controls each unit in the smartphone 100 according to programs stored in the non-volatile memory 103. The non-volatile memory 103 such as a hard disk (HD) and a read-only memory (ROM) stores data such as image data and audio data, and the various programs for the CPU 101 to operate.

The image processing unit 104 performs various types of image processing on the image data based on control performed by the CPU 101. The image data includes the image data stored in the non-volatile memory 103 and a recording medium 108, the image data acquired via the external I/F 109, and the image data acquired via the communication I/F 110. The types of image processing performed by the image processing unit 104 includes analog/digital (A/D) conversion, D/A conversion, and coding, compression, decoding, enlargement/reduction (i.e., resizing), noise reduction, and color conversion of the image data. The image processing unit 104 may be configured by a dedicated circuit block for performing specific image processing. Further, the CPU 101 may perform image processing according to a program without using the image processing unit 104 depending on the type of image processing.

The display 105 displays the images and a graphical user interface (GUI) screen that configures the GUI based on control performed by the CPU 101. The CPU 101 generates a display control signal according to the program, generates a video signal for displaying on the display 105, and controls each unit in the smartphone 100 to output a video image on the display 105. The display 105 thus displays the video image based on the output video signal.

The operation unit 106 is an input device for receiving a user operation. The operation unit 106 includes a device to input character information such as a keyboard, a pointing device such as a mouse or a touch panel, buttons, a dial, a joystick, a touch sensor, and a touch pad.

The touch panel includes an input device of a planar configuration attached to the display 105, and outputs coordinate information corresponding to a touched position. The CPU 101 is capable of detecting the following operations performed on the touch panel: a finger or a pen touching the touch panel (referred to as a "touchdown"); a state where the finger or the pen is in touch with the touch panel (referred to as a "touch on"); the finger or the pen moving with a touch kept on the touch panel (referred to as a "move"); the finger or the pen moving away from the touch panel (referred to as a "touch up"); and a state where the finger or the pen is not in touch with the touch panel (referred to as a "touch off"). Such operations and the coordinate of the position where the finger or the pen touches the touch panel are notified to the CPU 101 via the internal bus 150. The CPU 101 then determines the type of operation performed on the touch panel based on the notified information. If the "move" operation is performed, the CPU 101 can determine a moving direction of the finger or the pen on the touch panel for each vertical component and horizontal component on the touch panel based on a change in the position coordinate.

Further, if the "touchdown" operation is performed followed by the "touchup" operation via a predetermined amount of "move" operation performed on the touch panel, it indicates that a user has drawn a stroke. A rapid drawing of the stroke will be referred to as a "flick". The "flick" is an operation in which the user rapidly moves the finger touching the touch panel by a predetermined distance, and directly moves the finger away from the touch panel. In other words, The "flick" operation indicates a rapid stroke on the touch panel as if the finger flicks the touch panel. If the CPU 101 detects that the user has performed the "move" operation for the predetermined distance or longer at a predetermined speed or greater, and has then directly performed the "touch up" operation, the CPU 101 determines that the "flick" operation has been performed. Further, if the CPU 101 detects that the user has performed the "move" operation for the predetermined distance or longer at a speed less than the predetermined speed, the CPU 101 determines that a drag operation has been performed.

The touch panel may employ a resistive touch method, a capacitance method, a surface acoustic wave method, an infrared method, an electromagnetic induction method, an image recognition method, or an optical sensor method.

The recording medium 108 such as a memory card is attachable to the recording medium I/F 107. The recording medium I/F 107 thus reads the data from and writes the data to the attached recording medium 108 based on control performed by the CPU 101. The external I/F 109 connects to external devices via a wire cable or by air, and inputs and outputs the video signal and the audio signal. The communication I/F 110 communicates with the external devices and a network 111, and transmits and receives the various data such as files and commands.

Figure 2:
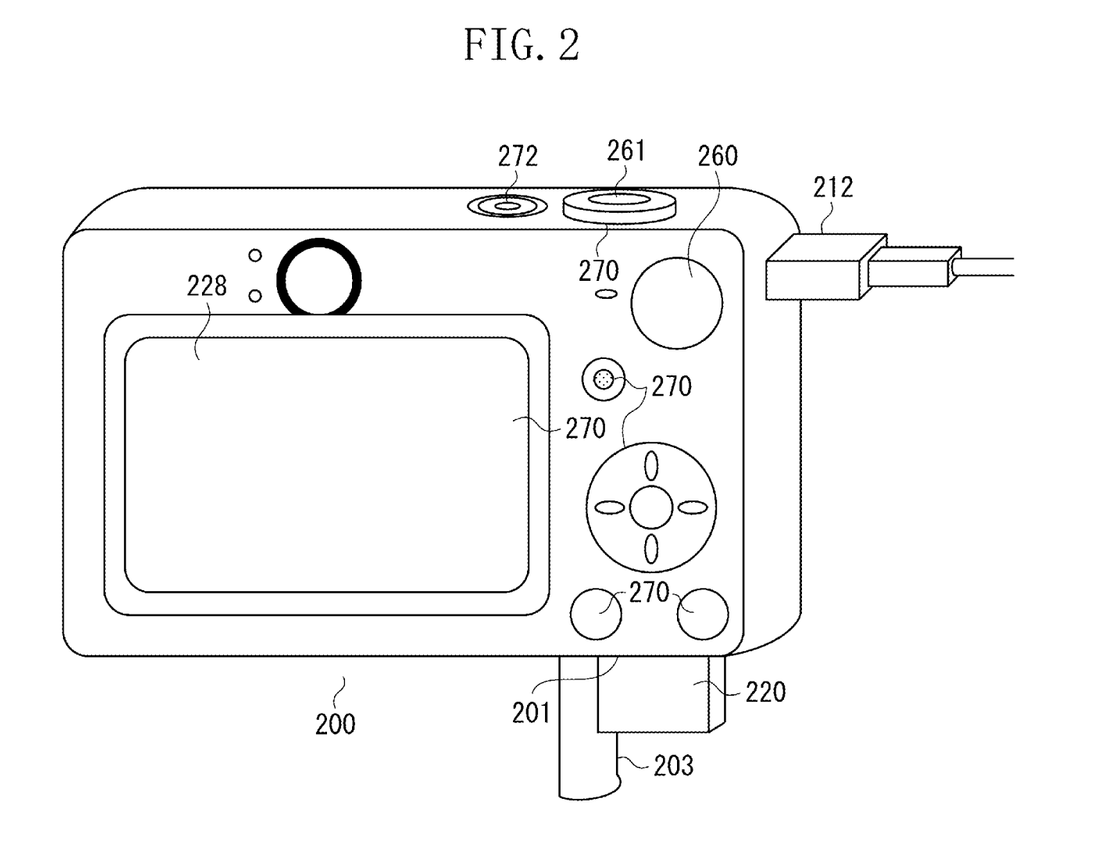
FIG. 2 is an external view illustrating a digital camera.

FIG. 2 is an external view illustrating the digital camera 200 that functions as the external device according to the exemplary embodiment of the present invention. Referring to FIG. 2, a display unit 228 disposed on a back surface of the digital camera 200 displays the images and various types of information. A shutter button 261 is an operation unit for instructing image capturing. A mode changing switch (i.e., a mode dial) 260 is an operation unit for switching between the various modes. A connector 212 connects a connection cable and the digital camera 200. The connector 212 can be used for both wire and wireless communication, and may or may not be detachably-attached.

An operation unit 270 includes operation members such as various switches, buttons, and the touch panel which receive the operations from the user. A power switch 272 is used to switch between power on and off. A recording medium 220 such as the memory card or the HD is stored in a recording medium slot 201. The recording medium 220 stored in the recording medium slot 201 is able to communicate with the digital camera 200. A lid 203 closes the recording medium slot 201.

Figure 3:
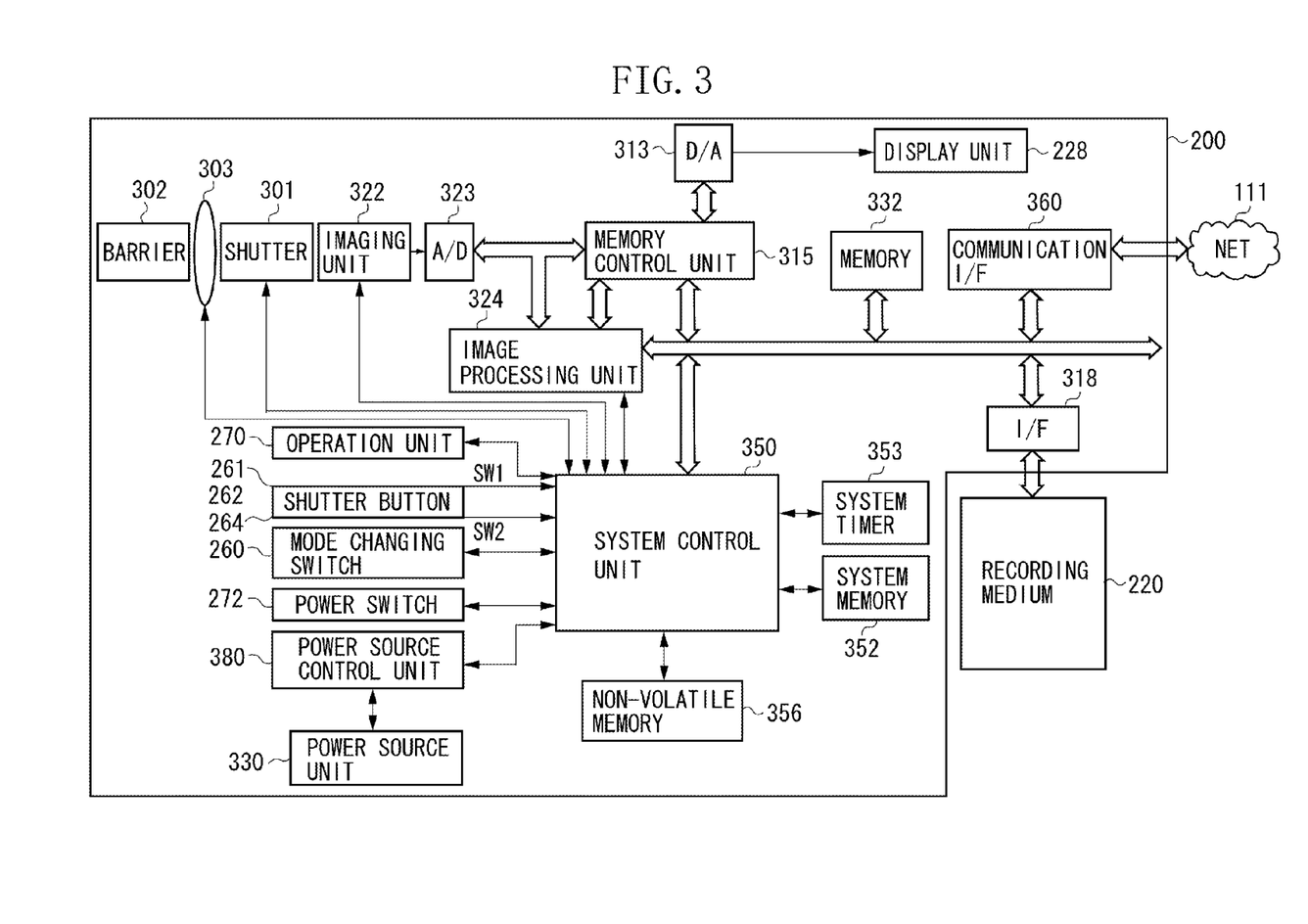
FIG. 3 illustrates a configuration of the digital camera.

FIG. 3 illustrates the configuration of the digital camera 200 according to the present exemplary embodiment. Referring to FIG. 3, an imaging lens 303 is a lens group including a zoom lens and a focus lens. A shutter 301 includes a diaphragm function. An imaging unit 322 is an image sensor such as a charge-coupled device (CCD) or a complementary metal-oxide semiconductor (CMOS) that converts an optical image to an electric signal. An A/D conversion unit 323 converts an analog signal output from the imaging unit 322 to a digital signal. A barrier 302 covers an imaging system including the imaging lens 303 to prevent the imaging system including the imaging lens 303, the shutter 301, and the imaging unit 322 from being soiled and damaged.

An image processing unit 324 performs predetermined pixel interpolation, resizing such as reduction, and color conversion to the data received from the A/D conversion unit 323 or from a memory control unit 315. Further, the image processing unit 324 performs predetermined calculation using the captured image data. A system control unit 350 then performs exposure control and focusing control based on the calculation result acquired by the image processing unit 324. As a result, through-the-lens (TTL) type auto-focusing (AF), auto-exposure (AE), and electronic flash pre-emission (EF) processing are performed. Furthermore, the image processing unit 324 performs predetermined calculation using the captured image data, and performs TTL-type auto-white balance (AWB) processing based on the acquired calculation result.

The data output from the A/D conversion unit 323 is directly written to a memory 332 via the image processing unit 324 and the memory control unit 315, or via the memory control unit 315. The memory 332 stores the image data acquired by the imaging unit 322 and converted to the digital data by the A/D conversion unit 323, and the image data to be displayed on the display unit 228. The memory 332 has sufficient storage capacity for storing a predetermined number of still images, and moving images and audio data of a predetermined length of time. Further, the memory 332 is also used as an image display memory (i.e., a video memory).

A D/A conversion unit 313 converts the image display data stored in the memory 332 to the analog data, and supplies the converted data to the display unit 228. As a result, the image data to be displayed, which is written to the memory 332, is displayed on the display unit 228 via the D/A conversion unit 313. The display unit 228 displays the data on a display device such as a liquid crystal display (LCD) according to the analog signal received from the D/A conversion unit 313. In other words, the D/A conversion unit 313 converts the digital signal, which has been once converted by the A/D conversion unit 323, to the analog signal and stored in the memory 332. The D/A conversion unit 313 then sequentially transfers the analog signal to the display unit 228 to display the data. The display unit 228 thus functions as an electronic viewfinder and becomes capable of displaying through-the-lens image.

A non-volatile memory 356, such as an electrically erasable and programmable ROM (EEPROM), is an electrically erasable and recordable memory. The non-volatile memory 356 stores constants and programs for the system control unit 350 to perform the operations. Such programs are for executing the flowcharts to be described below according to the present exemplary embodiment. The system control unit 350 controls the digital camera 200, and realizes the processes to be described below according to the present exemplary embodiment by executing the programs recorded in the non-volatile memory 356. A system memory 352 such as the RAM expands the constants, variables, and the programs read from the non-volatile memory 356 for the system control unit 350 to perform the operations. Further, the system control unit 350 performs display control by controlling the memory 332, the D/A conversion unit 313, and the display unit 228. A system timer 353 is a time measuring unit that measures the time used in various control, and the time of an internal clock.

The mode changing switch 260, a first shutter switch 262, a second shutter switch 264, and the operation unit 270 are operation units for inputting the various operation instructions to the system control unit 350.

The mode changing switch 260 switches the operation mode of the system control unit 350 to one of a still image recording mode, a moving image recording mode, and a playback mode. The still image recording mode includes an automatic image capturing mode, an automatic scene determination mode, a manual mode, various scene modes in which image capturing settings are specified for each image capturing scene, a program AE mode, and a custom mode. The user can directly switch to one of the modes included in the still image capturing mode using the mode changing switch 260. Alternatively, the user may once switch to the still image capturing mode using the mode changing switch 260, and then may use another operation member to switch to one of the modes included in the still image capturing mode. The moving image capturing mode may similarly include a plurality of modes.

If the user half-presses the shutter button 261 provided on the digital camera 200 while operating the shutter button 261 (i.e., instructs image capturing preparation), the first shutter switch 262 becomes ON and generates a first shutter switch signal SW1. The digital camera 200 then starts the operations of AF processing, AE processing, AWB processing, and EF processing. If the user then completes operating on the shutter button 261 and thus fully presses the shutter button 261 (i.e., instructs image capturing), the second shutter switch 264 becomes ON and generates a second shutter switch signal SW2. The system control unit 350 thus starts the series of image capturing operations, from reading the signal from the imaging unit 322 to writing the image data to the recording medium 220.

The user selects from various functional icons displayed on the display unit 228 and assigns a function to each operation member in the operation unit 270 as appropriate for each scene. The operation members thus operate as the functional buttons. The functional buttons include an end button, a back button, an image switching button, a jump button, a preview button, and an attribute change button. For example, if the user presses a menu button, the display unit 228 displays a menu screen on which the user can specify various settings. The user can intuitively specify the various settings using the menu screen displayed on the display unit 228, four buttons for instructing up, down, left, and right directions, and a SET button.

A power source control unit 380 includes a battery detection circuit, a direct current (DC)-DC converter, and a switching circuit for switching the block to be energized. The power source control unit 380 detects whether the battery is attached, the type of the battery, and remaining battery level. Further, the power source control unit 380 controls the DC-DC converter based on the detection result and the instruction from the system control unit 350, and supplies a required voltage to each unit including the recording medium 220 for a required period. A power source 330 includes a primary battery such as an alkaline battery or a lithium battery, a secondary battery such as a nickel-cadmium (NiCd) battery, nickel-metal halide (NiMH) battery, and lithium battery, and an alternating current (AC) adaptor.

A recording medium I/F 318 is an interface to the recording medium 220 such as the memory card and the HD. The recording medium 220 including a semiconductor memory or a magnetic disk is a recording medium for recording the captured image. A communication I/F 360 communicates with the external devices and the network 111, and transmits and receives various data such as files and commands.

The operation performed by the image display system according to the present exemplary embodiment will be described below with reference to FIGS. 4A, 4B, 5A, and 5B. The operation performed by the image display system for caching the image data recorded in the recording medium 220 of the digital camera 200 in the smartphone 100 via the communication I/F 360 and displaying the image data on the display 105 will be described below.

Figure 4A:
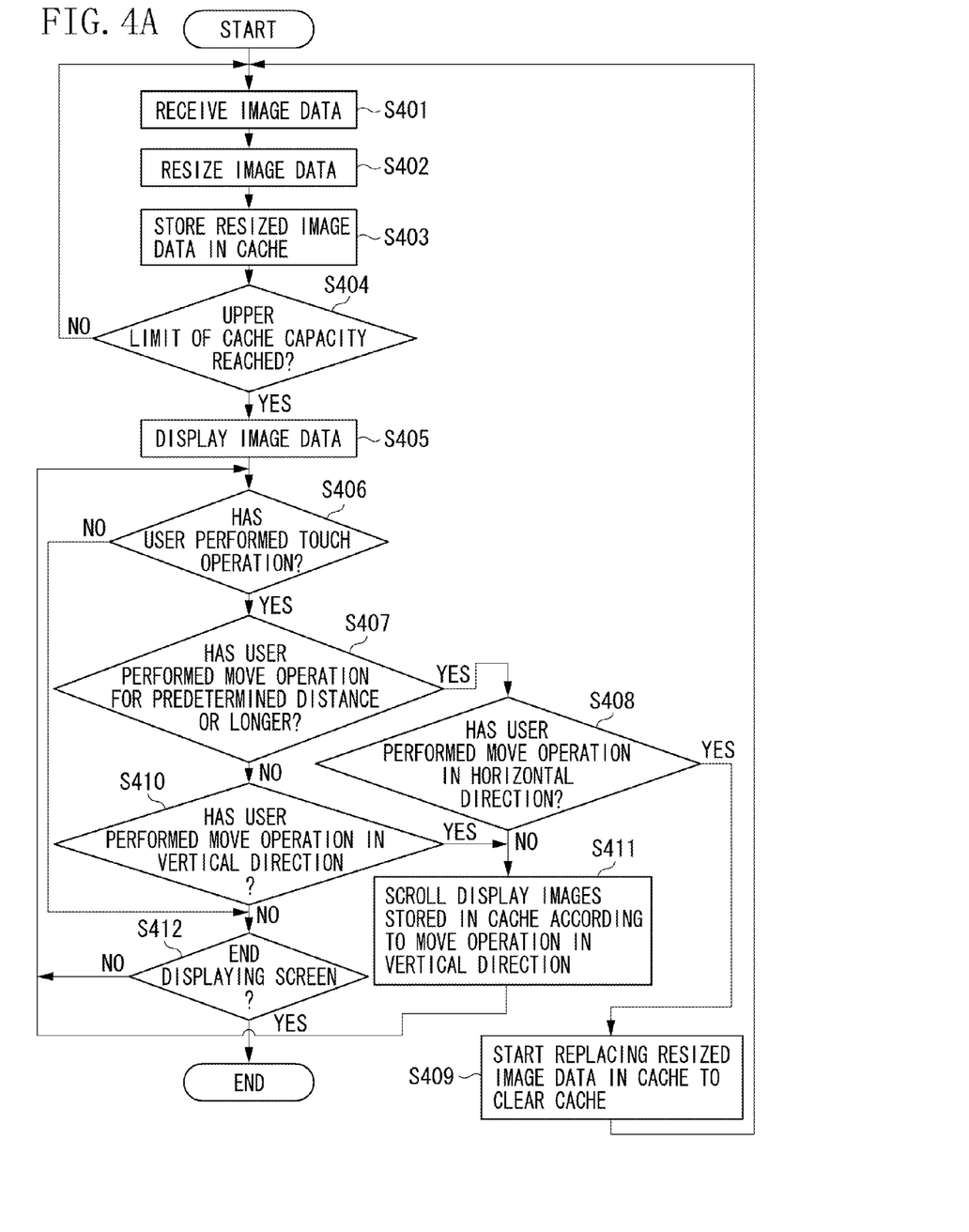
FIG. 4A is a flowchart illustrating an operation performed in a smartphone side of an image display system.

FIG. 4A is a flowchart illustrating the operation performed in the smartphone 100. More specifically, the flowchart illustrates the process for caching the image data recorded in the recording medium 220 in the digital camera 200 via the communication I/F 360 and displaying the image data on the display 105. Each process in the flowchart is realized by the CPU 101 that expands the program stored in the non-volatile memory 103 to the memory 102 and executing the program.

The CPU 101 in the smartphone 100 is logically connected via the communication I/F 110 to the communication I/F 360 in the digital camera 200 via the network 111. If the user opens an image viewing screen on the smartphone 100, the CPU 101 starts the process illustrated in FIG. 4A. The smartphone 100 is connected to the digital camera 200 so that the images can be transmitted and received according to a mutually determined communication protocol on a transmission control protocol/Internet protocol (TCP/IP).

In step S401, the CPU 101 receives from the digital camera 200 the image data recorded in the recording medium 220. When the CPU 101 starts receiving the image data, the CPU 101 notifies the digital camera 200 of a request to transfer the images to be stored (i.e., temporarily stored) in a cache area in the memory 102, i.e., a storing unit. The digital camera 200 receiving the transfer request then starts transmitting the image data to the smartphone 100, and the smartphone 100 thus receives the transmitted image data.

According to the present exemplary embodiment, the cache area in the memory 102 is to store 500 images. The number of images to be stored in the cache area is a predetermined number of the images to be displayed on one page on the image viewing screen of the smartphone 100. One page on the image viewing screen of the smartphone 100 indicates a screen range that can be displayed by scrolling in a vertical direction, instead of a one-screen range that can be displayed at a time. If the capacity of the cache area in the memory 102 is excessively large, the memory capacity to be used for other processes becomes small and may affect execution of the other processes. To solve such a problem, an upper limit of the number of cache is set to 500 images, so that the cache area is reserved only for caching up to 500 images.

If the transfer request from the CPU 101 to the digital camera 200 is an initial request after starting the process, the CPU 101 requests transferring the images among the displayable images from the first image to the 500$^{th}$ image in an order of file names. If the page is to be switched in response to a horizontal drag to be described below, a transfer request of 500 images in a previous page is issued by dragging in the right direction, and transfer request of 500 images in a subsequent page is issued by dragging in the left direction. Further, the CPU 101 may issue a transfer request for transferring the images corresponding to one page in an order so that the CPU 101 first receives the images to be included in the first display range of the page. The CPU 101 can thus readily display the newly switched page, which is further desirable.

In step S402, the CPU 101 resizes the image acquired from the recording medium 220 in the digital camera 200 according to the resolution of the image for performing a thumbnail display of the image appropriate for the display 105.

In step S403, the CPU 101 stores the resized image data in the cache area in the memory 102. The capacity of the cache area can thus be reduced by resizing the image data. Further, the capacity of the cache area required for storing a fixed number of images (i.e., 500 images according to the present exemplary embodiment) can be estimated, so that an unnecessary cache area is not reserved. Furthermore, the processing load generated up to displaying the image can be reduced by caching the image resized for displaying, and scrolling can be smoothly and rapidly performed with high responsiveness within the page (i.e., in the vertical direction according to the present exemplary embodiment).

In step S404, the CPU 101 determines whether the capacity of the stored resized images has reached the upper limit of the capacity of the cache area in the memory 102. The CPU 101 may instead determine whether the number of the stored resized images has reached 500 corresponding to one page. If the capacity of the stored resized images has reached the upper limit of the capacity of the cache (YES in step S404), the process proceeds to step S405. If the capacity of the stored resized images has not reached the upper limit of the capacity of the cache (NO in step S404), the process returns to step S401, and the CPU 101 continues to receive the image data. If the CPU 101 receives a transmission end request from the digital camera 200 before the capacity of the stored resized images reaches the upper limit of the capacity of the cache, the process also proceeds to step S405. An example of such a case is that the number of images recorded in the recording medium 220 in the digital camera 200 is less than 500.

Figure 5A:
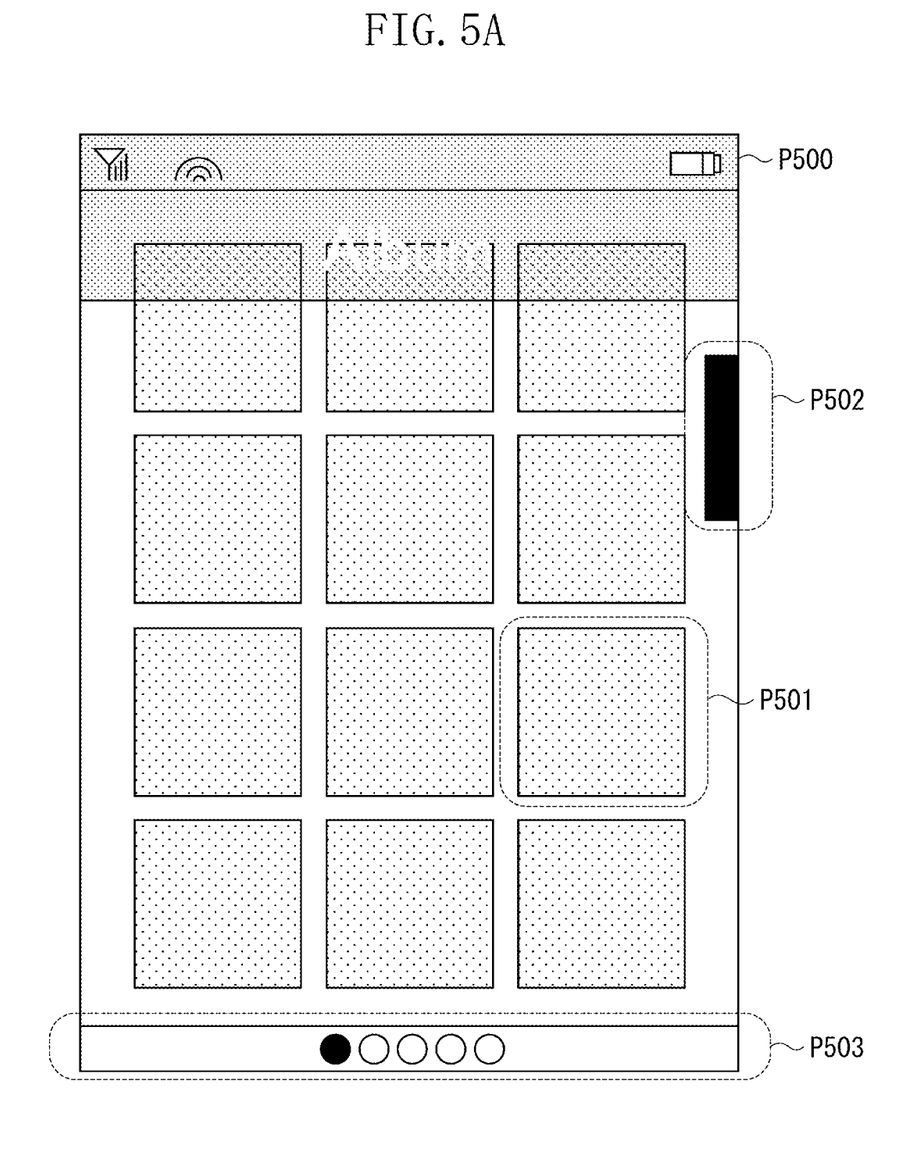
FIGS. 5A and 5B illustrate displays performed in the smartphone.

In step S405, the CPU 101 reads the resized image received from the digital camera 200 and stored in the cache area, and displays the resized image on the display 105. The CPU 101 displays the images, for example, in the order of the file names. FIG. 5A illustrates a display example of such a case (which will be described in detail below).

In step S406, the CPU 101 determines whether a touch operation (i.e., a "touchdown" operation) has been performed on the touch panel included in the operation unit 106. If the touch operation has been performed (YES in step S406), the process proceeds to step S407. If the touch operation has not been performed (NO in step S406), the process proceeds to step S412.

In step S407, the CPU 101 determines whether the touch operation which the CPU 101 has started to detect in step S406 is a "move" operation performed for a second distance D2 or longer. If the CPU 101 determines that the touch operation is a "move" operation performed for a second distance D2 or longer (YES in step S407), the process proceeds to step S408. If the CPU 101 determines that the touch operation is not a "move" operation performed for a second distance D2 or longer (NO in step S407), the process proceeds to step S410.

In step S408, the CPU 101 determines whether the "move" operation performed for a second distance D2 or longer is a "move" operation performed in the horizontal direction on the touch panel (i.e., the horizontal direction on the display 105). For example, if an X-direction (i.e., horizontal-direction) component of the "move" operation performed for a second distance D2 or longer is greater than a Y-direction (i.e., vertical-direction) component of the "move" operation, the CPU 101 determines that the "move" operation is performed in the horizontal direction. There are other methods for determining whether the user has intended to perform the "move" operation in the horizontal direction or in the vertical direction, so that the determination method is not limited thereto. If the CPU 101 determines that the "move" operation performed for a second distance D2 or longer is a "move" operation performed in the horizontal direction of the touch panel (i.e., the horizontal direction on the display 105) (YES in step S408), the process proceeds to step S409. If the CPU 101 determines that the "move" operation performed for a second distance D2 or longer is not a "move" operation performed in the horizontal direction on the touch panel (NO in step S408), the process proceeds to step S411. More generally, the "move" operation may be performed along a first axis or a second axis that is orthogonal to the first axis. The first axis may be in the vertical direction. The second axis may be in the horizontal direction. A "move" operation may be identified as being along a particular direction if it is substantially along that direction, while including a less substantial component along another direction.

In step S409, the CPU 101 starts performing the updating process for replacing the resized images in the cache area in the memory to switch the page. More specifically, the CPU 101 clears all of the resized images stored in the cache area.

Upon clearing the resized images, the CPU 101 notifies the digital camera 200 of a page transfer request based on the move direction. More specifically, if the "move" operation is performed in the left direction, the CPU 101 requests transferring of the subsequent page of the page currently displayed. If the move operation is performed in the right direction, the CPU 101 requests transferring of the previous page of the page currently displayed. The process then returns to step S401 and the CPU 101 receives the image data.

In step S411, the CPU 101 performs the scrolling process, i.e., scrolls the displayed images in the vertical direction in response to the amount of the "move" operation performed in the vertical direction. More specifically, the CPU 101 reads the image data from the cache area within the range of the 500 images stored in the cache area and included in the currently displayed page, and performs scrolling as follows. If the "move" operation is performed in the upward direction, the CPU 101 performs scrolling so that the images arranged downstream with respect to the currently displayed images (i.e., below the images currently displayed) are displayed. If the "move" operation is performed in the downward direction, the CPU 101 reads the image data from the cache area and performs scrolling so that the images arranged upstream with respect to the currently displayed images (i.e., above the images currently displayed) are displayed.

The CPU 101 may continue scrolling in the direction according to the previous move direction even after the user has performed the "touch up" operation, decelerate the scrolling speed, and stop scrolling, i.e., perform inertial scrolling. A large number of images can be scrolled in response to the "flick" operation by performing inertial scrolling. Since scrolling in the vertical direction is performed using the image data which has been resized and recorded in the cache area, scrolling can be performed at high speed and with high responsiveness to the user operation. Upon ending vertical scrolling, the process returns to step S406, and the CPU 101 again waits for the touch operation.

On the other hand, in step S410, the CPU 101 determines whether there has been a "move" operation performed in the vertical direction for a first distance D1 or longer that is shorter than the second distance D2. The first distance D1 is a threshold value for determining whether the touch operation is a tap operation in which the user performs the "touchdown" operation and immediately moves the finger or the touch pen away from the position (i.e. "touch up" operation), or is an operation including the "move" operation. The first distance D1 is thus sufficiently shorter than the second distance D2. If the CPU 101 determines that there has been a "move" operation performed in the vertical direction for the first distance D1 or longer (YES in step S410), the process proceeds to step S411. In step S411, the CPU 101 performs vertical scrolling.

In other words, an instruction to switch the page by updating the cache cannot be issued unless the "move" operation is performed in the left or the right direction for the distance longer than the second distance D2. A heavy operational feeling is thus given to the user so that the page cannot be easily switched. In contrast, vertical scrolling which instructs switching the images displayed within the page can be performed even when the "move" operation is performed for the second distance D2 or shorter, and is thus of a lighter operational feeling. As a result, scrolling is performed with high responsiveness to the user operation.

In step S412, the CPU 101 determines whether there has been an event for ending displaying of the image viewing screen on the display 105. Examples of the end event are switching off the smartphone 100 and switching the smartphone 100 to another operation mode. The communication cut-off with the digital camera 100 may also be an end event. If there is no end event (NO in step S412), the process returns to step S406, and the CPU 101 again waits for the touch operation. If there is an end event (YES in step S412), the process ends.

Figure 4B:
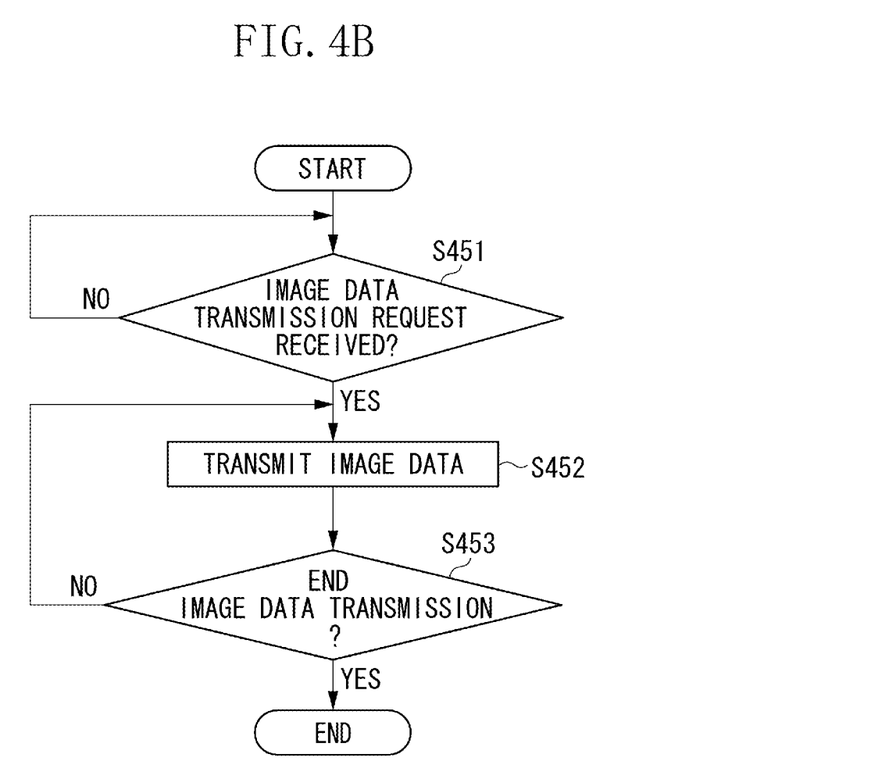
FIG. 4B is a flowchart illustrating an operation performed in a digital camera side of the image display system.

FIG. 4B is a flowchart illustrating the operation performed in the digital camera 200. More specifically, FIG. 4B is a flowchart illustrating the process for transmitting the images recorded in the recording medium 220 to the smartphone 100 via the communication I/F 360.

In step S451, the system control unit 350 determines whether an image data transfer request has been received as a communication request from the smartphone 100 via the communication I/F 360. If the system control unit 350 determines that the transfer request has been received (YES in step S451), the process proceeds to step S452. If the system control unit 350 determines that the transfer request has not been received (NO in step S451), the system control unit 350 waits to receive the transfer request.

In step S452, the system control unit 350 reads the image data from the recording medium 220 via the recording medium I/F 318 in response to the image data transfer request. The system control unit 350 then transmits the image data read from the recording medium 220 to the smartphone 100 via the communication I/F 360.

In step S453, the system control unit 350 determines whether transmission of the image data which has been requested to be transferred has been completed. If the transmission of the image data which has been requested to be transferred has been completed, or if all of the image data in the recording medium 220 among the image data which has been requested to be transferred has been transmitted (YES in step S453), the system control unit 350 notifies the smartphone 100 of transmission completion. The process then ends. If the transmission of the image data which has been requested to be transferred has not been completed (NO in step S453), the system control unit 350 continues to transmit the images.

FIG. 5A illustrates an example of the user interface (UI) displaying an image list on the display 105 in the smartphone 100. According to the present exemplary embodiment, a UI layout displays 500 images for one page as described above.

Referring to FIG. 5A, an image viewing screen P500 in the display 105 displays the image list. The number of images to be displayed is determined based on the resolution of the display 105 and the display size of the images. In the example illustrated in FIG. 5A, 12 images are displayed.

An image displayed in the image viewing screen P500 is indicated as a rectangle P501.

A display area P502 indicates a scroll position with respect to the vertical direction of the UI layout in the image list displayed in the image viewing screen P500.

A display area 503 indicates a scroll position in the UI layout displayed on the image viewing screen P500. In the example illustrated in FIG. 5A, the image list screen P500 displays the image data in the UI layout on the first page among five pages. In other words, the image data in the UI layout on the first page among five pages is cached.

Figure 5B:
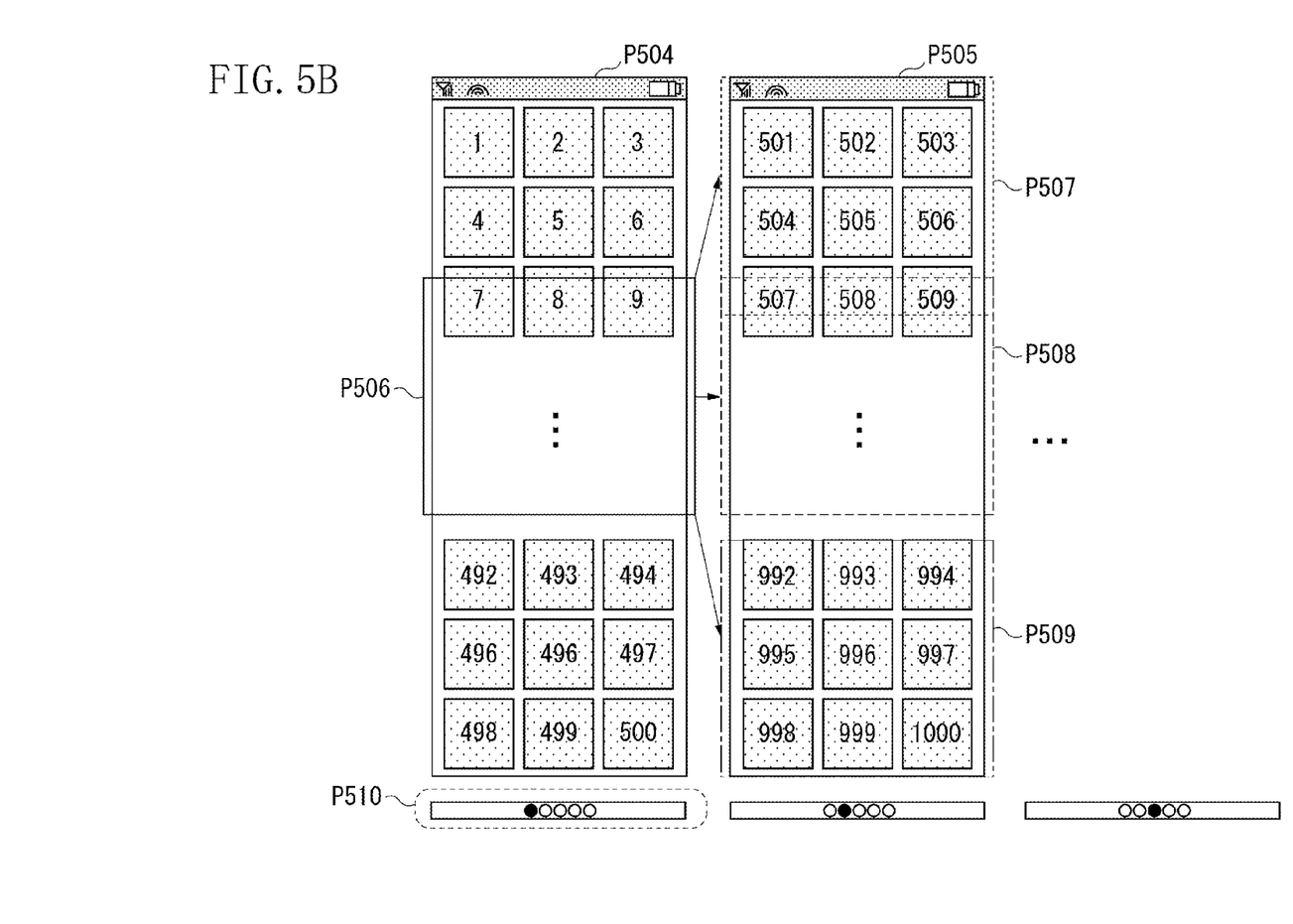

FIG. 5B is a conceptual diagram illustrating a display order in performing scrolling and page switching according to the process described with reference to FIG. 4A.

Referring to FIG. 5B, a UI layout P504 displays the first image to the 500$^{th}$ image in one page. The UI layout P504 indicates the UI layout on the first page among five pages.

A UI layout P505 displays the 501$^{st}$ image to the 1000$^{th}$ image in one page. The UI layout P505 indicates the UI layout on the second page among five pages.

A rectangle P506 indicates a display area of the image list on the display 105 on the UI layout P504. In other words, the images in the area P506 are displayed as the image list on the image viewing screen (i.e., the image viewing screen P500 illustrated in FIG. 5A). An example in which 12 images are displayed as the image list is illustrated in FIG. 5A. FIG. 5B illustrates an example in which 9 images are displayed as the image list for ease of description.

A rectangle P508 indicates a display area of the image list on the UI layout P505, i.e., the area in the scroll position corresponding to the display area P506 of the image list on the UI layout P504.

A rectangle P507 indicates an area of the image list in an uppermost portion (i.e., a top portion) on the UI layout P505. A rectangle P509 indicates an area of the image list at a lowermost portion (i.e., a bottom portion) on the UI layout P505.

A display area P510 indicates the scroll position in the UI layout displayed on the image viewing screen P500.

The UI illustrated in FIGS. 5A and 5B are designed so that the image data to be displayed are all cached when scrolled in the vertical direction, i.e., one reciprocating direction. In contrast, the UI illustrated in FIGS. 5A and 5B are designed so that the image data is not cached when scrolled in the horizontal direction, i.e., the other reciprocating direction. As a result, a usage amount of the cache memory usable by the application in the smartphone 100 does not reach the upper limit. Further, the UI illustrated in FIGS. 5A and 5B are designed so that scrolling in the horizontal direction (i.e. page switching) is not performed unless there is the "move" operation performed for the second distance D2 or longer. Page switching that causes the cache to be updated thus does not occur unless the user intentionally performs the "move" operation in the horizontal direction. Such a "move" operation can be realized by an operation similar to the "move" operation performed in the vertical direction.

It is assumed that the user is viewing the image list in the area P506 on the image viewing screen on the display 105 as illustrated In FIG. 5B. In such a case, if the user performs the "move" operation for the second distance D2 or longer in the horizontal direction, the UI layout jumps from the UI layout P504 to the UI layout P505, i.e., the cache is updated (the page is switched). The display position on the display 105 after the transition may be the area P507, the area P508, or the area P509. According to the present exemplary embodiment, the display position is to be the area P508. If the UI layout jumps to such a display position, and it is assumed that the subsequent page and thereafter are arranged on a same plane, the user can switch to the page for displaying the images to be viewed as follows. The user can switch to the page by performing the "move" operation in the opposite direction of the direction in which the images to be viewed are arranged. An intuitive operational feeling is thus provided to the user. The area P507 which always displays the top portion of the page after switching may also be employed.

Further, if the page is switched to the subsequent page by performing the "move" operation in the left direction, the area P507 that displays from the top portion of the subsequent page may be displayed. If the page is switched to the previous page by performing the "move" operation in the right direction, the area P509 that displays from the bottom portion of the subsequent page may be displayed. As a result, the area closer to the images on the currently viewed page becomes displayed for both cases. If the user desires to view from the top of the subsequent page, high operability is realized by switching the area to be displayed from the area P506 to the area P507. Further, if the user desires to perform image search for each of the number of images corresponding to one page (i.e., 500 images according to the present exemplary embodiment), high operability is realized by switching the area to be displayed from the area P506 to the area P508. Furthermore, if the images arranged in the area P506 is in an opposite order of the images arranged in the area P508, high operability is realized by switching the area to be displayed from the area P506 to the area P509.

As described above, according to the present exemplary embodiment, the number of images per one page is 500 in terms of the images that can be cached. However, it is not limited thereto, and an event in which the images are captured (e.g., a trip or a sports day), an image capturing time, or a combination of both is applicable as the unit for one page (i.e., a group).

Further, according to the present exemplary embodiment, the operations in the vertical and horizontal direction are described as the examples. However, the directions are not limited thereto. For example, the "move" operation performed for the distance D1 may be determined as an operation for instructing scrolling within the cached images, and the "move" operation performed for the distance D2 in the same direction may be determined as an operation for instructing updating of the cache for displaying the images that have not been cached.

According to the present exemplary embodiment, the user can scroll vertically within the page, or update the displayed image by switching the page, by performing the "move" "operation in the opposite direction of the direction in which the image to be viewed is arranged, i.e., with a similar touch operational feeling. The user can thus perform both vertical scrolling within the page and page switching by an intuitive operation. Further, the cache updating can only be performed by the user intentionally performing the operation, i.e., the "move" operation for the second distance D2 or longer. As a result, frequent cache updating (i.e., frequently receiving the images from the digital camera 200 as the external device) without user's intention can be prevented. Unnecessary processing load can thus be reduced, so that power consumption is decreased, and an adverse effect on the other operations can also be reduced.

The user operability may also be maintained by determining the communication speed of the image data received from the digital camera 200 and changing the capacity to be cached according to the determined communication speed. For example, the cache area can be adjusted so that the amount that can be cached at one time is decreased as the communication speed becomes lower.

Further, in the flowchart illustrated in FIG. 4A, the instruction for switching the page by updating the cache can only be issued when the "move" operation is performed for the second distance D2 or longer. However, a move speed may be adjusted in addition to the distance to add heaviness to the operational feeling, so that the instruction cannot be issued unless intentionally performed. For example, the instruction may be determined as a page switching instruction only when the "move" operation is performed in the horizontal direction for a predetermined distance D3 (>D1) or longer for a predetermined time T1 or longer, i.e., a slow "move" operation is performed.

Furthermore, according to the present exemplary embodiment, the smartphone 100 receives the image from the digital camera 200 and caches the image. However, the smartphone 100 is not limited to receiving the image from the external device. For example, the present invention is applicable to a case where the smartphone 100 caches the image into the cache memory from the recording medium (e.g., the non-volatile memory 103) connected thereto.

Moreover, the display control apparatus may include only the I/F for outputting the video signal to be displayed on the display, i.e., the display unit, and the display may be an external monitor (i.e., a TV).

Further, control performed by the CPU 101 may be realized by a single hardware device, or control of the apparatus may be performed by a plurality of hardware devices sharing execution of the processes.

Each of the above-described exemplary embodiments illustrates only an exemplary embodiment of the present invention, and the exemplary embodiments may be combined as appropriate.

Furthermore, according to the above-described exemplary embodiments, the present invention is applied to the smartphone. However, it is not limited thereto, and the present invention may be applied to any display control apparatus that displays the images on a touch-controllable display unit. For example, the present invention may be widely applied to a personal computer, a personal digital assistant (PDA), a cellular phone, a portable image viewer, a printer apparatus having a display screen, a digital photo frame, and an electronic book reader.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-002209 filed Jan. 10, 2012, which is hereby incorporated by reference herein in its entirety.

What is claimed is:

1. A display control apparatus comprising:
   a detection unit configured to detect a touch operation on a display unit;
   a storing unit configured to temporarily store data of a plurality of images; and
   a display control unit configured to perform, in response to the detection unit detecting a touch operation of a first type including a movement for a first distance or longer with a touch kept on the display unit, a scrolling process for scrolling an image displayed on the display unit to display another image temporarily stored in the storing unit, and to perform, in response to the detection unit detecting a touch operation of a second type including a movement for a predetermined distance or longer with a touch kept on the display unit, an updating process for updating the data of the plurality of images temporarily stored in the storing unit with data of another plurality of images to display the images included in the other plurality of images on the display unit,
   wherein the predetermined distance is longer than the first distance.

2. The display control apparatus according to claim 1, further comprising a determination unit configured to determine whether a moving direction of a touch operation including a movement with a touch kept on the display unit detected by the detection unit is in one reciprocating direction or in the other reciprocating direction,
   wherein the display control unit performs the scrolling process in response to the detection unit detecting a touch operation including a movement in the one reciprocating direction with a touch kept on the display unit, and performs the updating process in response to the detection unit detecting a touch operation including a movement for the predetermined distance or longer in the other reciprocating direction with a touch kept on the display unit.

3. The display control apparatus according to claim 2, wherein the display control unit performs scrolling in the scrolling process, in response to the touch operation in the one reciprocating direction, to display an image disposed upstream in a direction of the touch operation, and performs updating in the updating process, in response to the touch operation in the other reciprocating direction, with data of another plurality of images belonging to a previous group, or to data of another plurality of images belonging to a subsequent group, according to a direction of the touch operation.

4. The display control apparatus according to claim 1, wherein the display control unit performs the updating process, in response to the detection unit detecting a touch operation including a movement for the predetermined distance or longer with a touch kept on the display unit, the movement requiring a predetermined length of time or longer.

5. The display control apparatus according to claim 1, further comprising a receiving unit configured to receive data of an image recorded on a recording medium in an external device,
   wherein the storing unit temporarily stores data of a plurality of images received by the receiving unit.

6. The display control apparatus according to claim 5, wherein the receiving unit receives the data of the images by performing wireless communication with the external device.

7. The display control apparatus according to claim 5, wherein the external device includes a digital camera.

8. The display control apparatus according to claim 5, further comprising a unit configured to determine a communication speed of image data received from the external device, and to reduce an amount of image data temporarily stored in the storing unit as the communication speed decreases.

9. A control method for a display control apparatus including a detection unit configured to detect a touch operation on a display unit, and a storing unit configured to temporarily store data of a plurality of images, the control method comprising:
   performing, in response to the detection unit detecting a touch operation of a first type including a movement for a first distance or longer with a touch kept on the display unit, a scrolling process for scrolling an image displayed on the display unit to display another image temporarily stored in the storing unit; and
   performing, in response to the detection unit detecting a touch operation of a second type including a movement for a predetermined distance or longer with a touch kept on the display unit, an updating process for updating the data of the plurality of images temporarily stored in the storing unit with data of another plurality of images to display the images included in the other plurality of images on the display unit, wherein the predetermined distance is longer than the first distance.

10. A non-transitory computer-readable storage medium storing a program that causes a computer to function as each unit of the display control apparatus according to claim 1.

11. A method for controlling an apparatus comprising:
displaying on the apparatus a first subset of a first plurality of images stored on the apparatus;
detecting a touch operation on the apparatus of a first type including a first movement for a first distance or longer or a second type including a movement for a predetermined distance or longer;
in response to detecting a touch operation of the first type, displaying on the apparatus a second subset of the first plurality of images stored on the apparatus;
in response to detecting a touch operation of the second type, sending a request to an external device for a second plurality of images, and displaying on the apparatus a third subset of the second plurality of images,
wherein the predetermined distance is longer than the first distance.

12. The method according to claim 11, wherein:
the touch operation of the first type includes a move operation along a first axis; and
the touch operation of the second type includes a move operation along a second axis orthogonal to the first axis.

13. The method according to claim 12, further comprising:
receiving the first plurality of images from the external device before they are displayed on the apparatus.

14. The method according to claim 12, wherein:
the move along the first axis is in a vertical direction; and
the move along the second axis is in a horizontal direction.

15. The method according to claim 12, wherein:
the move along the first axis is in a long side direction of the display unit; and
the move along the second axis is in a short side direction of the display unit.

16. A display control apparatus comprising:
a detection unit configured to detect a touch operation on a display unit;
a storing unit configured to temporarily store data of a plurality of images; and
a display control unit configured to perform, in response to the detection unit detecting a touch operation including a movement for a predetermined distance or longer with a touch kept on the display unit, a scrolling process for scrolling an image displayed on the display unit to display another image temporarily stored in the storing unit,
wherein, in a case where the touch operation detected by the detection unit is an operation along a first axis, the display control unit does not perform an updating process for updating the data of the plurality of images temporarily stored in the storing unit with data of another plurality of images to display the images included in the other plurality of images on the display unit, and in a case where the touch operation detected by the detection unit is an operation along a second axis orthogonal to the first axis, the display control unit performs the updating process.

17. The method according to claim 16, wherein:
the move along the first axis is in a vertical direction; and
the move along the second axis is in a horizontal direction.

18. The method according to claim 16, wherein:
the move along the first axis is in a long side direction of the display unit; and
the move along the second axis is in a short side direction of the display unit.

* * * * *